(12) United States Patent
Chakra et al.

(10) Patent No.: US 9,952,647 B2
(45) Date of Patent: Apr. 24, 2018

(54) MANAGED COLLABORATIVE CHARGING

(71) Applicant: INTERNATIONAL BUSINESS MACHINES CORPORATION, Armonk, NY (US)

(72) Inventors: Al Chakra, Apex, NC (US); Liam Harpur, Dublin (IE); John Rice, Drummoyne (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 133 days.

(21) Appl. No.: 14/863,033

(22) Filed: Sep. 23, 2015

(65) Prior Publication Data
US 2017/0083073 A1    Mar. 23, 2017

(51) Int. Cl.
*G06F 1/32* (2006.01)
*G06F 1/28* (2006.01)

(52) U.S. Cl.
CPC ............. *G06F 1/3212* (2013.01); *G06F 1/28* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | |
|---|---|---|---|
| 5,914,585 A * | 6/1999 | Grabon | G06F 1/163 307/29 |
| 8,299,939 B2 | 10/2012 | Gudlavenkatasiva et al. | |
| 8,830,888 B2 | 9/2014 | Shin et al. | |
| 2011/0016333 A1 | 1/2011 | Scott et al. | |
| 2013/0214615 A1* | 8/2013 | Taleb | H02J 7/35 307/104 |
| 2013/0268223 A1* | 10/2013 | Plestid | G01R 31/3679 702/63 |
| 2014/0008990 A1* | 1/2014 | Yoon | H02J 5/005 307/104 |

(Continued)

FOREIGN PATENT DOCUMENTS

WO    9808179    2/1998

OTHER PUBLICATIONS

Lin, J.C., Wireless Power Transfer for Mobile Applications, and Health Effects, Antennas and Propagation Magazine, IEEE, Apr. 2013, pp. 250-253, vol. 55, Issue: 2.

(Continued)

*Primary Examiner* — Zahid Choudhury
(74) *Attorney, Agent, or Firm* — Tutunjian Bitetto, P.C.; William A. Kinnaman, Jr.

(57) ABSTRACT

A method and system are provided for managing wireless collaborative charging between at least two mobile devices that include a first mobile device and a second mobile device. The method includes monitoring power usage for at least one of the at least two mobile devices. The method further includes predicting power requirements for at least one of the at least two mobile devices. The method also includes authorizing wirelessly sending power from the first mobile device to the second mobile device based on at least one of the power usage and the power requirements.

20 Claims, 8 Drawing Sheets

(56) References Cited

U.S. PATENT DOCUMENTS

| | | | | |
|---|---|---|---|---|
| 2014/0183962 A1* | 7/2014 | Qian | ........................ | H02J 7/025 307/104 |
| 2014/0285134 A1* | 9/2014 | Kim | ........................ | H02J 7/025 320/103 |
| 2015/0097442 A1* | 4/2015 | Muurinen | ............ | H04B 5/0037 307/104 |
| 2016/0028269 A1* | 1/2016 | Miller | ...................... | H02J 50/10 455/573 |
| 2016/0049825 A1* | 2/2016 | Green | ..................... | H02J 7/025 320/108 |
| 2016/0062425 A1* | 3/2016 | Cudak | ....................... | G06F 1/26 713/300 |
| 2016/0070322 A1* | 3/2016 | Sultenfuss | .............. | H02J 7/025 713/300 |
| 2016/0087474 A1* | 3/2016 | Tallada | ................. | H02J 7/0054 320/103 |
| 2017/0060207 A1* | 3/2017 | Backman | ................ | G06F 1/266 |

OTHER PUBLICATIONS

Mearian, L., "Wireless Charging from 30 Feet Away—Does Startup Have a Game-Changer?", Computerworld Sep. 2013, 4 pages.

Woollaston, V., The End of the Charger? Wi-Fi Powered Phones Could One Day Make Plug-in Powering Obsolete, Daily Mail, Nov. 2013, 20 pages.

\* cited by examiner

MANAGED COLLABORATIVE CHARGING

BACKGROUND

Technical Field

The present invention relates generally to charging electronic devices and, in particular, to managed collaborative charging.

Description of the Related Art

Battery packs are used to power many devices from laptops to mobile phones and so on. The problem many people face with using battery power is that sometimes the batteries go dead leaving the device powered by the batteries as unusable. In the modern age, batteries are important as they allow business people to communicate and work on the move using battery-powered mobile devices.

In the future, there will be many methods to charge devices wirelessly. Further to that end, devices with an in-built or external dual transmitter/receiver could receive and send charge wirelessly. Indeed the in-built or external dual transmitter/receiver could directionally send the charge. The problem with the preceding wireless charging scenario is that there is limited power that can be transmitted wirelessly. For example, a phone may consume 7.5 watts while being used and being charged at the same time, while the above wireless charging devices might only transmit a fraction of a watt which can be very problematic. As another example, in a face-to-face meeting with several participants, a person demonstrating an application might need several watts but current consumption outstrips supply. Thus, there is a need for a way to efficiently manage power drain in mobile devices.

SUMMARY

According to an aspect of the present principles, a method is provided for managing wireless collaborative charging between at least two mobile devices that include a first mobile device and a second mobile device. The method includes monitoring power usage for at least one of the at least two mobile devices. The method further includes predicting power requirements for at least one of the at least two mobile devices. The method also includes authorizing wirelessly sending power from the first mobile device to the second mobile device based on at least one of the power usage and the power requirements.

According to another aspect of the present principles, a system is provided for managing wireless collaborative charging between at least two mobile devices that include a first mobile device and a second mobile device. The system includes a power usage monitor for monitoring power usage for at least one of the at least two mobile devices. The system further includes a power requirements predictor for predicting power requirements for at least one of the at least two mobile devices. The system also includes a collaborative charging manager and mode selector for authorizing wirelessly sending power from the first mobile device to the second mobile device based on at least one of the power usage and the power requirements.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to managed collaborative charging.

In an embodiment, the present principles provide a method and system for collaboratively charging a device by understanding the relatedness of the devices. For example, bursting and/or otherwise providing a charge to a target device at a given location can be accomplished by orchestrating routing of the available charge via other devices. Such routing can be done either in series and/or parallel to the target device.

Figure 1:
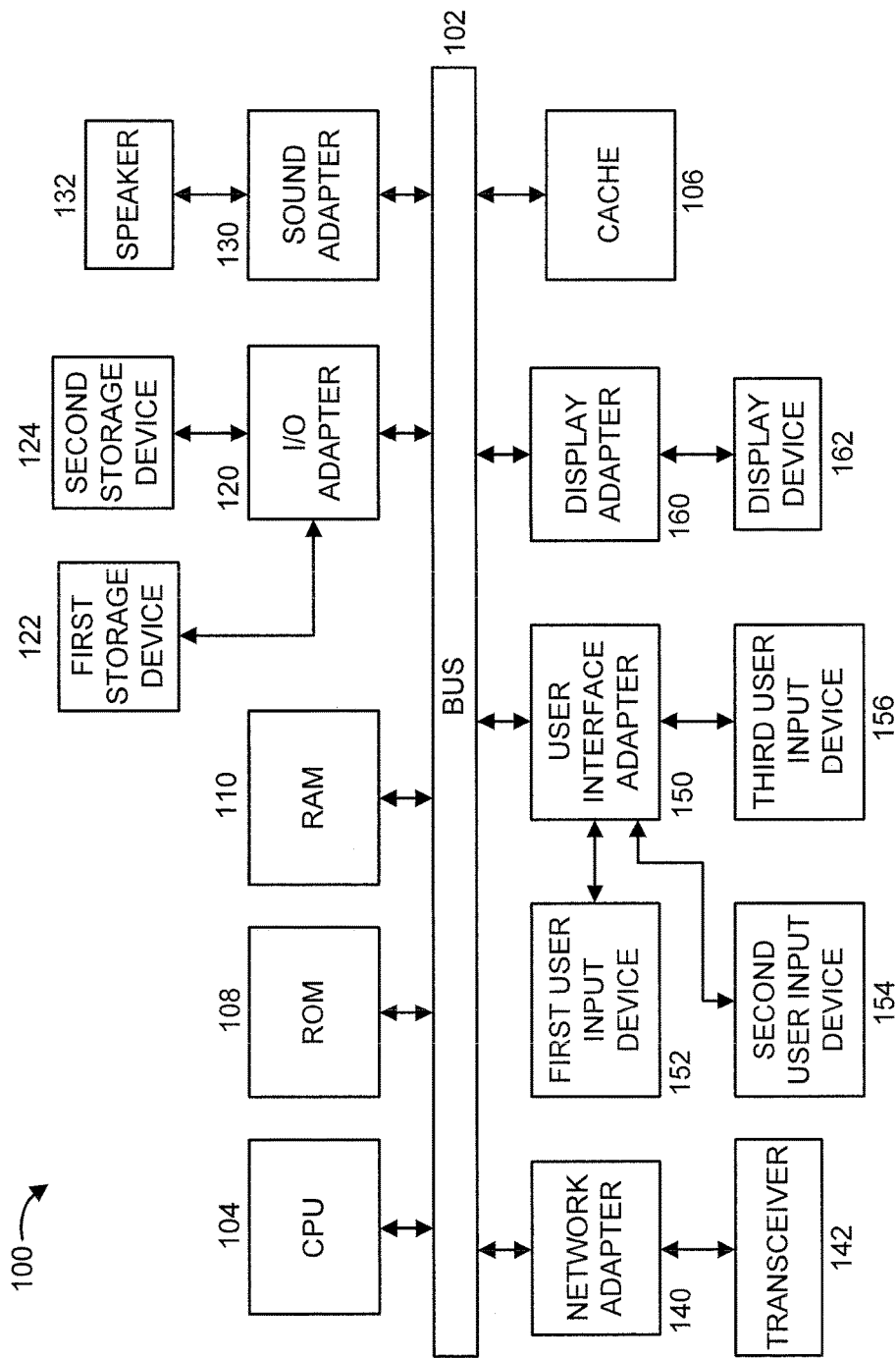
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles.

The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
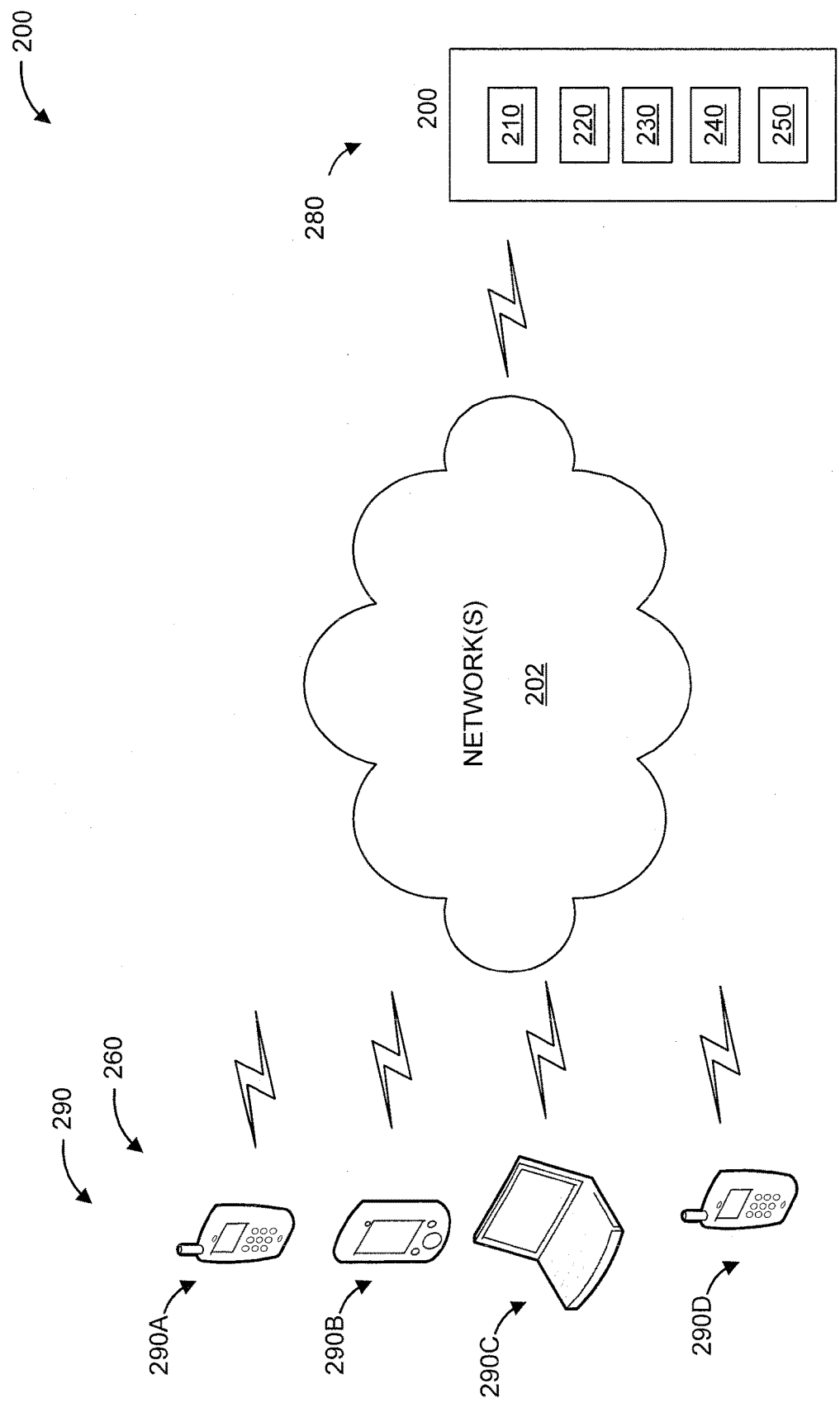
FIG. 2 shows an exemplary system 200 for managed collaborative charging, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 5:
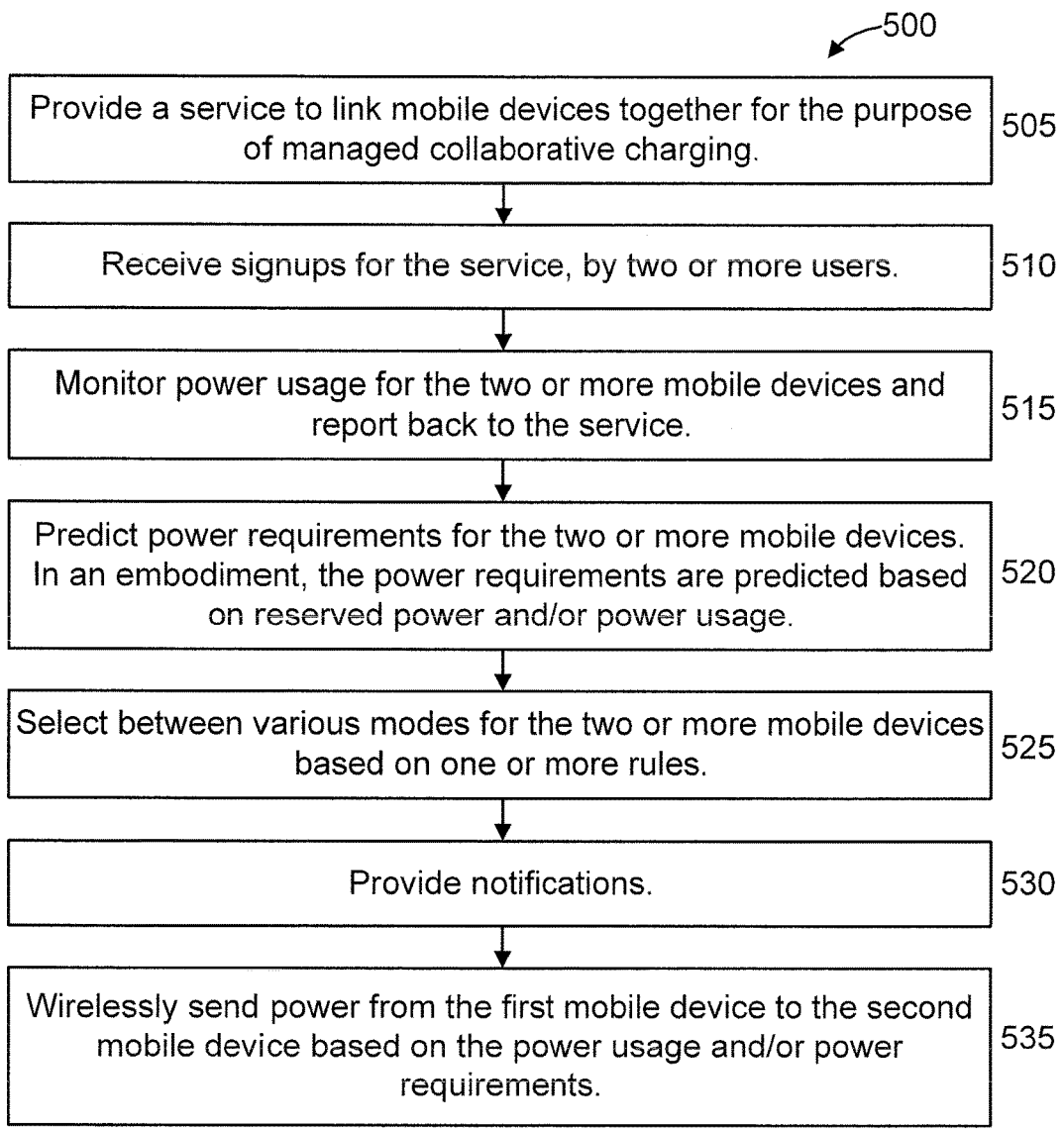
FIG. 5 shows an exemplary method 500 for managed collaborative charging, in accordance with an embodiment of the present principles.

Further, it is to be appreciated that processing system 100 may perform at least part of the method described herein including, for example, at least part of method 500 of FIG. 5. Similarly, part or all of system 200 may be used to perform at least part of method 500 of FIG. 3.

FIG. 2 shows an exemplary system 200 for managed collaborative charging, in accordance with an embodiment of the present principles. The system 200 interacts with two or more mobile devices, collectively denoted by the reference numeral 290.

The system 200 includes a service manager 210, a power usage monitor 220, a power requirements predictor 230, a collaborative charging manager and mode selector 240, a notification device 250, and in-device wireless chargers 260.

The service manager 210 provides a service to link the mobile devices 299 together for the purpose of managed collaborative charging.

The power usage monitor 220 monitors power usage for the mobile devices 299.

The power requirements predictor 230 predicts power requirements for the mobile devices 299. In an embodiment, the power requirements are predicted based on reserved power and/or power usage.

The collaborative charging manager and mode selector 240 selects between various modes for the mobile devices 299 based the power usage and/or the power requirements. In an embodiment, mode selection can be further based on one or more rules. In an embodiment, a mobile device in a first mode operates as a charge contributor, a mobile device in a second mode operates as a charge receiver, and a mobile device in a third mode operates as a charge re-transmitter that re-transmits a charge to another mobile device.

The notification device 250 provides notifications. The notifications can be of mode selections, charging order, power thresholds, power requirement, and so forth.

The in-device wireless chargers 260 wirelessly sends power from one or more of the mobile devices to one or more other mobile devices (from among mobile devices 299), e.g., based on the power usage and/or power requirements.

In an embodiment, the service manager 210, the power usage monitor 220, the power requirements predictor 230, the collaborative charging manager and mode selector 240, and the notification device 250 are part of a shared cloud server device 280 supporting the service and managed collaborative charging.

The mobile devices 290 includes at least mobile devices 290A, 290B, 290C, and 290D. The mobile devices 290 can include any type of mobile device including, but not limited to, phones, tablets, laptops, media players, portable game systems, and so forth.

While one or more elements may be shown as separate elements, in other embodiments, these elements can be combined as one element. The converse is also applicable, where while one or more elements may be part of another element, in other embodiments, the one or more elements may be implemented as standalone elements. Thus, for example, while the service manager 210 and the collaborative charging manager and mode selector 240 are shown as separate elements, in other embodiments, these elements can be combined and embodied by a single element. As another example, while the collaborative charging manager and mode selector 240 is shown as a single element performing the functions of collaborative charging managing and mode selection, in other embodiments, these functions can be implemented in two separate elements. These and other variations of a mobile device are readily determined by one of ordinary skill in the art, given the teachings of the present principles provided herein, while maintaining the spirit of the present principles.

Figure 3:
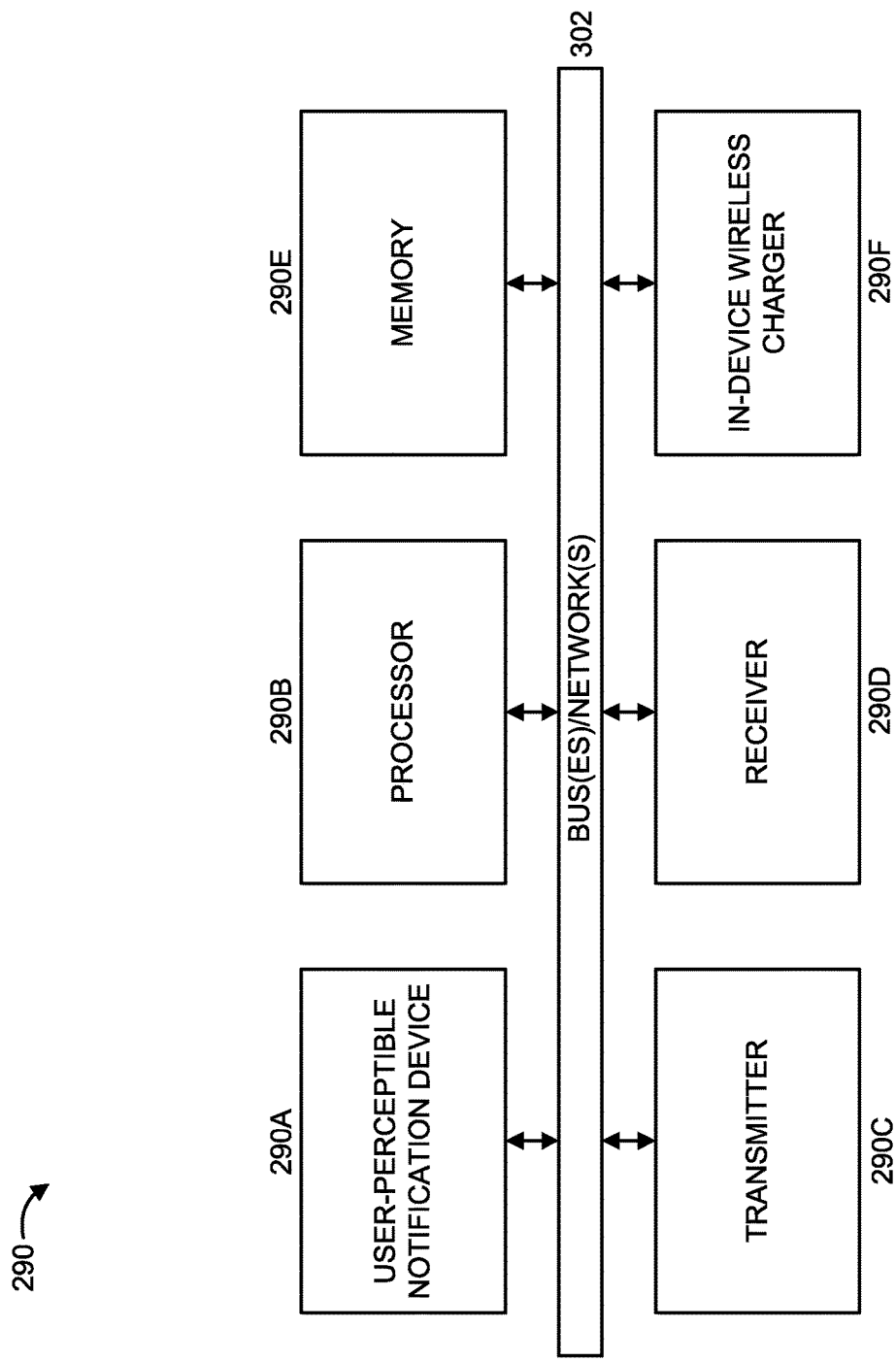
FIG. 3 further shows a mobile device 290, in accordance with an embodiment of the present principles.

FIG. 3 further shows a mobile device 290, in accordance with an embodiment of the present principles.

Each of the mobile devices 290 can include a user-perceptible notification device 290A for providing notifications to a user. The notifications can be provided and/or otherwise originate from the service manager 210, the power usage monitor 220, the power requirements predictor 230, the collaborative charging manager and mode selector 240, the notification device 250, and/or one or more of the mobile devices 290. The user-perceptible notification device 290A can be, for example, a display, a speaker, and so forth. Each of the mobile devices 290 can further include a processor 290B, a transmitter 290C, a receiver 290D, a memory 290E, and an in-device collaborative wireless charger 290F. Other elements included in the mobile devices are not shown or described for the sake of brevity, but are readily appreciated by one of ordinary skill in the art. In other embodiments, one or more of the mobile devices 290 include a transceiver in place of the transmitter 290C and receiver 290D.

In the embodiment shown in FIG. 3, the elements thereof are interconnected by a bus(es)/network(s) 302. However, in other embodiments, other types of connections can also be used. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of a mobile device are readily determined by one of ordinary skill in the art, given the teachings of the present principles provided herein, while maintaining the spirit of the present principles.

Figure 4:
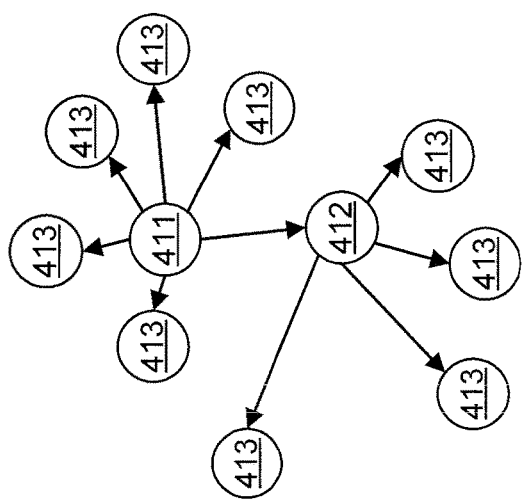
FIG. 4 shows an exemplary environment 400 to which the present principles can be applied, in accordance with an embodiment of the present principles.
Figure 4:
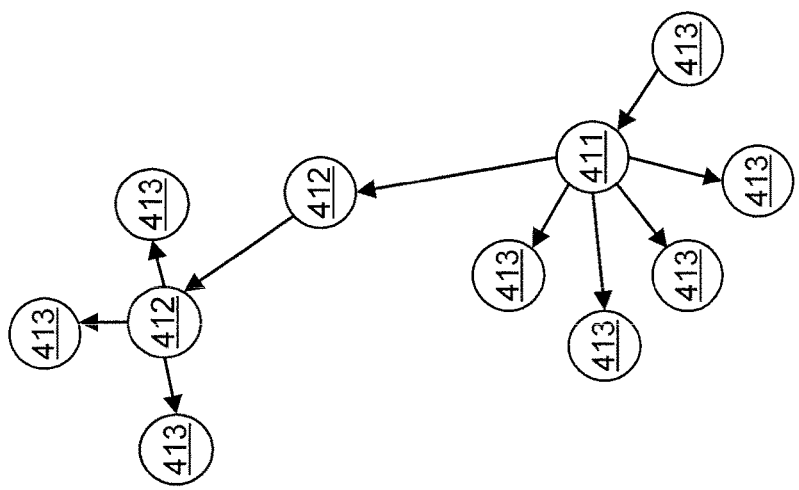

FIG. 4 shows an exemplary environment 400 to which the present principles can be applied, in accordance with an embodiment of the present principles.

The environment 400 includes a plurality of nodes 410, with some nodes acting as charge contributors 411, other nodes acting as charge re-transmitters 412, and yet other nodes acting as charge receivers 413. Each of the nodes 410 represent a respective mobile device to which the present principles can be applied.

In the embodiment of FIG. 4, two nodes are acting as charge contributors. However, in other embodiments, one or more than two nodes can act as charge contributors. These and other variations are encompassed by the teachings of the present principles.

FIG. 5 shows an exemplary method 500 for managed collaborative charging, in accordance with an embodiment of the present principles. The method 500 is performed with respect to two or more mobile devices that include a first mobile device and a second mobile device.

At step 505, provide a service to link mobile devices together for the purpose of managed collaborative charging. In an embodiment, step 505 can involve providing an application for downloading to support the service and the managed collaborative charging. The application can be downloaded, for example, from an application market place. In an embodiment, the application can be part of the operating system of the device.

At step 510, receive signups for the service, by two or more users.

At step 515, monitor power usage for the two or more mobile devices and report back to the service. In an embodiment, the mobile devices to which the present principles are applied are determined based on, but not limited to, for example, registration to the service and/or a proximity criteria.

At step 520, predict power requirements for the two or more mobile devices. In an embodiment, the power requirements are predicted based on reserved power and/or power usage. In an embodiment, the reserved power is embodied by the current battery charge amount. In an embodiment, the power usage is based on the display brightness, the volume setting, whether GPS is enabled, whether wireless communication (e.g., cellular, WIFI, Bluetooth) is enabled, the applications that are running, and so forth.

At step 525, select between various modes for the two or more mobile devices based on one or more rules. In an embodiment, a mobile device in a first mode operates as a charge contributor, a mobile device in a second mode operates as a charge receiver, and a mobile device in a third mode operates as a charge re-transmitter that re-transmits a charge to another mobile device.

At step 530, provide notifications. In an embodiment, the mobile devices are notified of the mode selections. The notification to a particular mobile device can be of the mode selection for the particular mobile device and can include the mode selections for other mobile devices. In an embodiment, the service notifies a user of a charging order and respective power thresholds of the at least two mobile devices. In an embodiment, at least one of the one or more mobile devices notifies at least another one of the one or more mobile devices of its power requirements.

At step 535, wirelessly send power from the first mobile device to the second mobile device based on the power usage and/or power requirements. In an embodiment, step 535 involves the collaborative charging manager and mode selector 240 authorizing wirelessly sending power from the first mobile device to the second mobile device based on the power usage and/or the power requirements. In an embodiment, the power is focused in a direction of the second mobile device. In an embodiment, the power is wirelessly sent further based on one or more pre-specified criterion. In an embodiment, the pre-specified criterion can be overridden based on one or more other criterion or a specific instruction. In an embodiment, the one or more other criterion include a level of seniority, a level of importance to an entity, and one or more temporal criterion. In an embodiment, the second mobile device has more charge than the first mobile device, and the one or more pre-specified criterion comprise keeping the second mobile device powered as long as possible. While only two devices are essentially described in the steps of method 500, in other embodiments, more than two devices can be managed such that more than one device can be collaboratively charged at the same time in step 535, while maintaining the spirit of the present principles.

A description will now be given of various aspects of the present principles.

In an embodiment, the present principles are embodied as a system (or method) that (1) has an overview of the meeting participants and/or collaborative group; (2) has an overview of current and future energy requirements by device; (3) understands the transmitting and receiving charging distance of each device; (4) allows communication/notification of energy usage to the involved party (the computer user, administrator, manager); and (5) allows users to define rules and semantics to fine-tune autonomous behavior of the charging devices, e.g., collaboratively work together to always charge the device with the lowest charge or the most important user at a particular point in time (or particular time period).

Indeed, in an embodiment, a group or organization may be able to impose a policy such as: "For meetings, meeting participants should work collaboratively such that devices under 20% charge are charged using this system"

In an embodiment, each device will have a record that denotes if it is a net contributor of charge to the network or if the device is a net receiver of charge or indeed if the device is acting as a re-transmitter of charge. In an embodiment, such a record can be implemented as follows:

| | |
|---|---|
| DeviceName | Phone-873sa |
| Charge | 2 Volts |
| IdealCharge | 8 Volts |
| TimeRestriction | 43 Minutes |
| TransmitMode | Active |
| ReTransmitMode | Active |
| ReceiveMode | Active |
| ReTransmitFrom | Notebook-43k |
| ReTransmitTo | Tablet-772 |

This necessitates several measures to ensure that the concerned devices can deal with this collaborative charging as follows.

Hardware/software vendors configure and test their applications to ensure they can safely be enabled for wireless charging in accordance with the present principles. For example, test that the specified device can directionally transmit and re-transmit charge using induction and/or resonant transmission. Note that the hardware/applications may be specified by corporate policies and thus may be on a "tested" list.

A monitor detects the energy consumption of individual devices. In an embodiment, a manager is used to control which devices get activated as transmitters, receivers, or re-transmitters.

Before a device changes mode (e.g., transmit or re-transmit or receive charge), the semantics or rules for waking up are known.

The management engine would monitor the stimuli for each of the devices and, if a trigger was activated, the mode request would be sent to the device.

The user or business or relevant manager or other entity could impose certain constraints such as, for example, " . . . allow users to change the mode of the device". Additionally, this over-ride functionality can be enabled based on many variables including the following:

seniority within the organization (e.g., A senior manager could override this functionality on their machine)

importance within the organization (e.g., a sales person who is about to land a large contract can override this functionality on their machine)

temporal criteria (e.g., do not allow the system to re-transmit after 3 PM).

In an embodiment, a user or business configures one or more features of the present principles to be enabled or not in their environment, or in what circumstances the features are enabled and/or disabled.

In an embodiment, one or more features of the present principles can be enabled and/or disabled based on organizational and social network criteria (e.g., enable the ability to enforce application hibernation if that user is less senior than a second-line manager, and so forth.).

A device may trigger an exit from the system if the device leaves the transmit range or re-transmission range or receive range.

A background process will monitor each registered device and inform the user of any significant device activity that warrants a device to change mode.

As the system analyzes the anticipation of power need per device, perhaps a device may have more charge, but if presenting, for example, the device will draw more power, so the system could keep the device charging as long as possible before the device dies (stops operating properly due to lack of sufficient power) even though wireless charging could not keep up with the drain.

A description will now be given of a scenario to which the present principles can be applied, in accordance with an embodiment of the present principles.

In the scenario, there are 12 people in a meeting room attending a meeting. All users have left their machines running. Some users have a very low charge while other users have an adequate charge. User A is demonstrating an energy intensive application demonstration and requires a "burst" of energy to complete the demonstration. The wireless charge received by user A is not adequate. For example, user A is only receiving 0.75 watts out of a total of 5.0 watts required. In addition, user A has another back-to-back meeting and requires some additional charge for the batteries which will require an average of 7.5 watts of electricity in the next hour.

Advantageously, the present principles provide a system where logical charging conditions can be set, and where these collaborative charging conditions can change dynamically according to the necessity of the situation. In such a scenario, an energy management system can monitor applications with respect to energy consumption and impact on the system and autonomously handle charging to meet the demands of the group.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
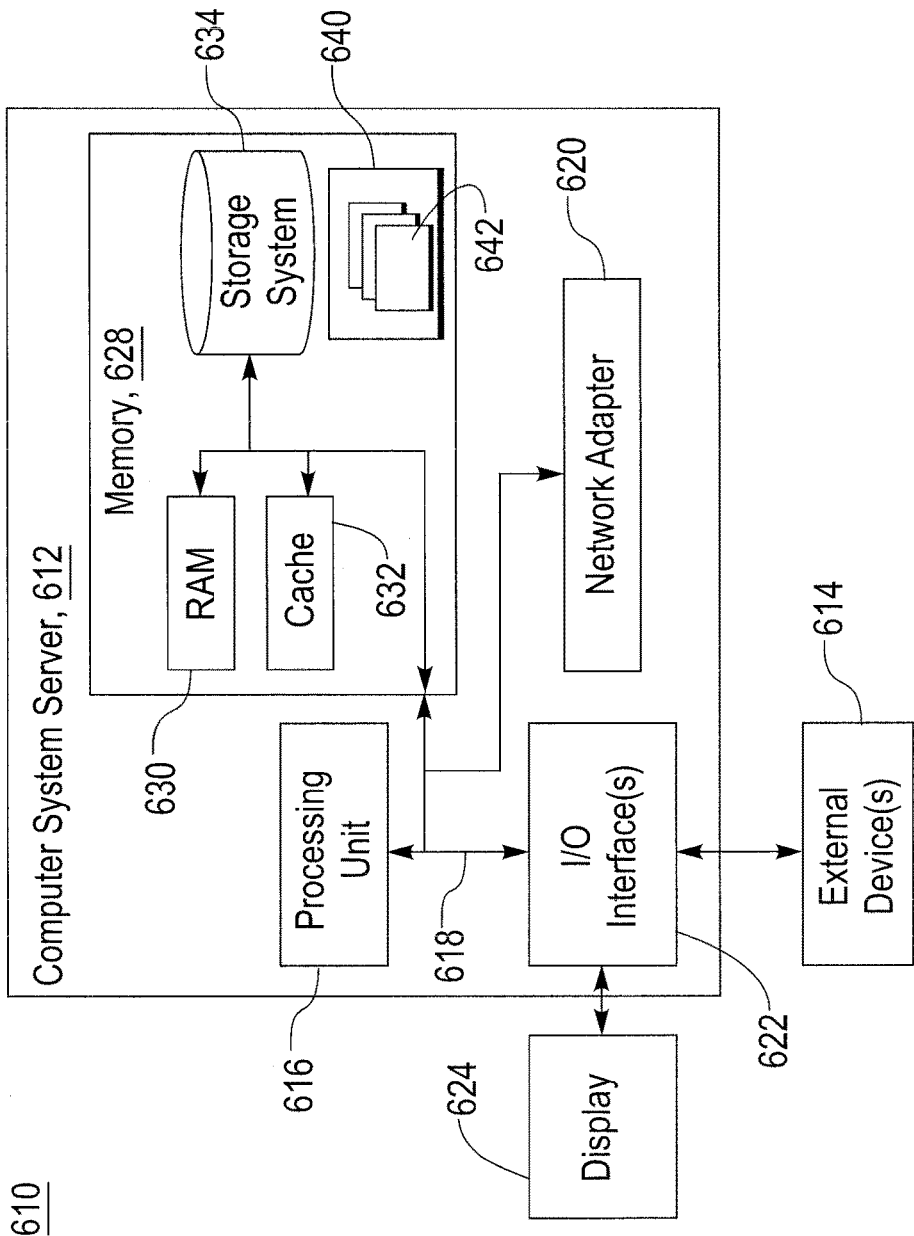
FIG. 6 shows an exemplary cloud computing node 610, in accordance with an embodiment of the present principles.

Referring now to FIG. 6, a schematic of an example of a cloud computing node 610 is shown. Cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Figure 7:
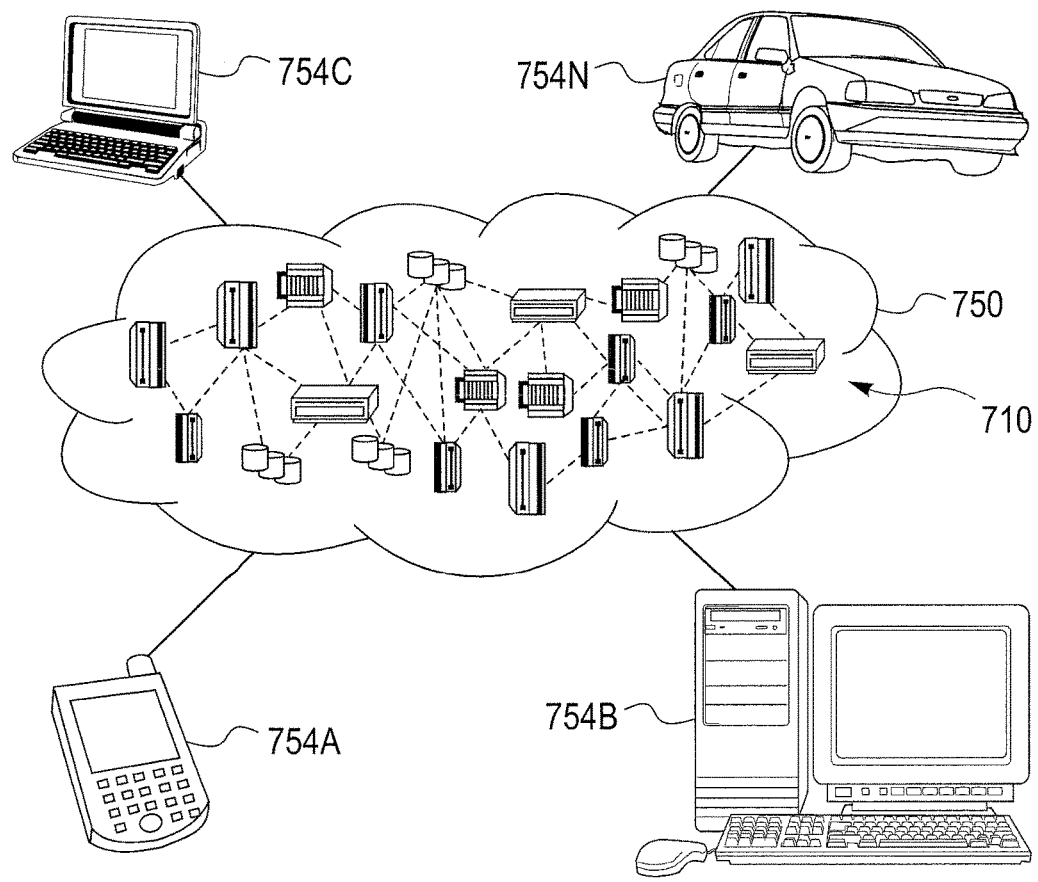
FIG. 7 shows an exemplary cloud computing environment 750, in accordance with an embodiment of the present principles.

Referring now to FIG. 7, illustrative cloud computing environment 750 is depicted. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
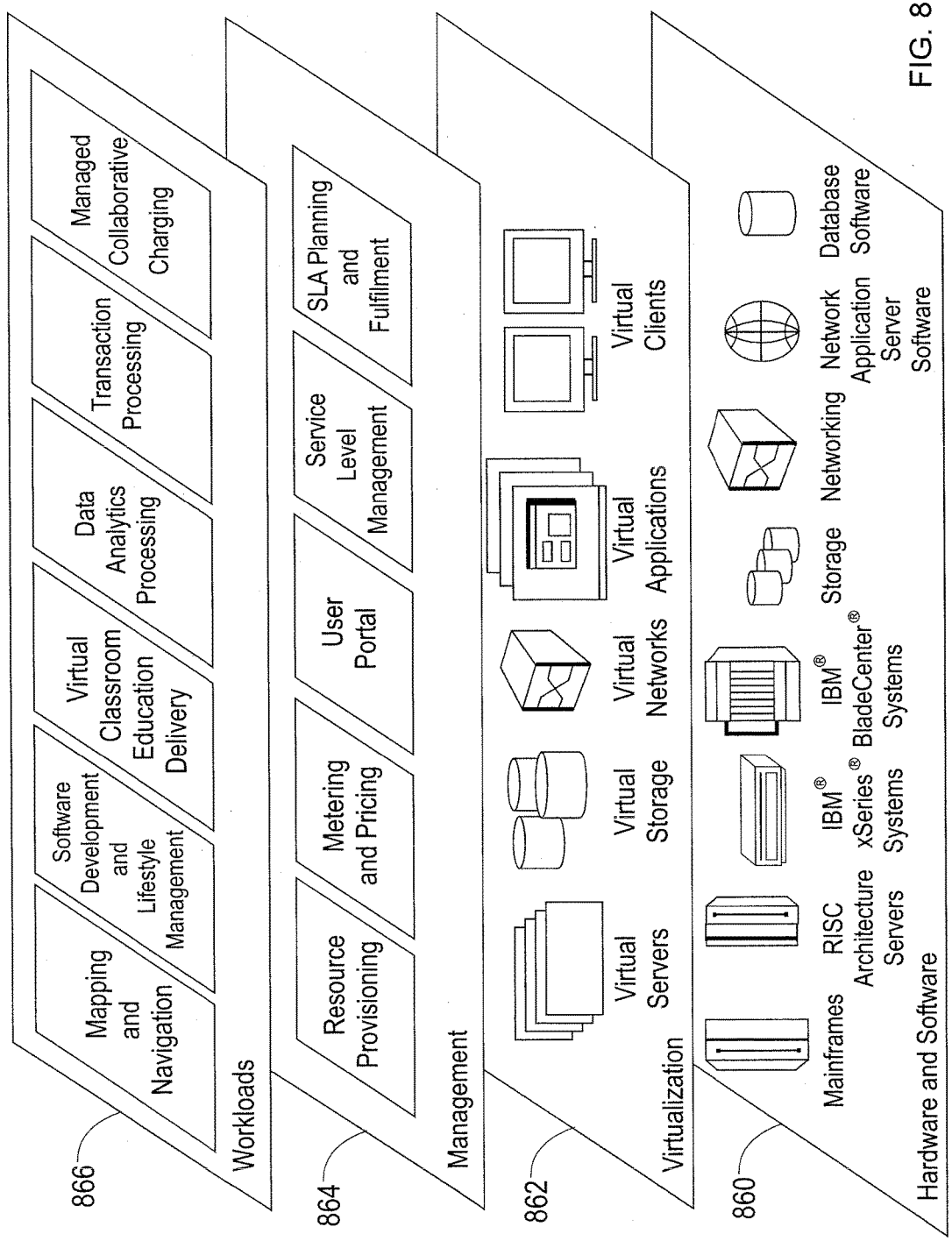
FIG. 8 shows exemplary abstraction model layers, in accordance with an embodiment of the present principles.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 862 provides an abstraction layer from which the following examples of virtual entities may be provided: virtual servers; virtual storage; virtual networks, including virtual private networks; virtual applications and operating systems; and virtual clients.

In one example, management layer 864 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 866 provides examples of functionality for which the cloud computing environment may be utilized. Examples of workloads and functions which may be provided from this layer include: mapping and navigation; software development and lifecycle management; virtual classroom education delivery; data analytics processing; transaction processing; and managed collaborative charging.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for managing wireless collaborative charging between at least two mobile telecommunication devices that include a first mobile device and a second mobile device, the method comprising: monitoring power usage for at least one of the at least two mobile telecommunication devices; predicting power requirements for at least one of the at least two mobile telecommunication devices; and authorizing wirelessly sending power from the first mobile device, through one or more intermediary mobile telecommunication devices dynamically configured as power re-transmitters, to the second mobile device based on the power usage and the power requirements.

2. The method of claim 1, wherein the at least two mobile telecommunication devices are determined by a proximity criteria.

3. The method of claim 1, wherein the power is focused in a direction of the second mobile device.

4. The method of claim 1, wherein the power is wirelessly sent further based on one or more pre-specified criterion.

5. The method of claim 4, wherein the second mobile device has more charge than the first mobile device, and the one or more pre-specified criterion comprise keeping the second mobile device powered as long as possible.

6. The method of claim 4, wherein at least one of the one or more pre-specified criterion is over-ridable based on one or more other criterion or a specific instruction.

7. The method of claim 6, wherein the one or more other criterion comprise a level of seniority, a level of importance to an entity, and one or more temporal criterion.

8. The method of claim 1, wherein the power requirements are predicted based on at least one of reserved power and the power usage.

9. The method of claim 1, wherein the at least two mobile telecommunication devices are determined by a registration to a service.

10. The method of claim 9, wherein the service collects at least the power usage and the power requirements for the at least two mobile telecommunication devices and notifies a user of a charging order and respective power thresholds of the at least two mobile telecommunication devices.

11. The method of claim 1, wherein the second mobile device notifies the first mobile device of the power requirements of the second mobile device.

12. The method of claim 1, wherein the at least two mobile telecommunication devices form or are comprised in a network, and at least one of the at least two mobile telecommunication devices is switchable to a first mode as a charge contributor to the network, a second mode as a charge receiver from the network, and a third mode as a charge re-transmitter that re-transmits a charge to another one of the at least two mobile telecommunication devices in the network.

13. The method of claim 12, wherein a selection between the modes is made based on at least one of the power usage and the power requirements.

14. The method of claim 13, wherein a selection between the modes is made further based on one or more rules.

15. The method of claim 12, further comprising informing at least one of the mobile telecommunication devices of a mode selection for the at least one of the mobile telecommunication devices.

16. The method of claim 12, further comprising informing at least one of the at least two mobile telecommunication devices of a mode selection of at least another one of the least two mobile telecommunication devices.

17. A non-transitory article of manufacture tangibly embodying a computer readable program which when executed causes a computer to perform the steps of claim 1.

18. A system for managing wireless collaborative charging between at least two mobile telecommunication devices that include a first mobile device and a second mobile device., the system comprising: a processor and a memory, configured to: monitor power usage for at least one of the at least two mobile telecommunication devices; predict power requirements for at least one of the at least two mobile telecommunication devices; and authorize wirelessly sending power from the first mobile device, through one or more intermediary mobile telecommunication devices dynamically configured as power re-transmitters, to the second mobile device based on the power usage and the power requirements.

19. The system of claim 18, wherein the at least two mobile telecommunication devices form or are comprised in a network, and at least one of the at least two mobile telecommunication devices is switchable to a first mode as a charge contributor to the network, a second mode as a charge receiver from the network, and a third mode as a charge re-transmitter that re-transmits a charge to another one of the at least two mobile telecommunication devices in the network.

20. The system of claim 19, wherein a selection between the modes is made based on one or more rules.

* * * * *